(12) United States Patent
Ye

(10) Patent No.: US 7,808,578 B2
(45) Date of Patent: Oct. 5, 2010

(54) LIGHT GUIDE PLACE AND LIGHT-DIFFUSING STRUCTURE THEREOF

(75) Inventor: Zhi-Ting Ye, Miaoli County (TW)

(73) Assignee: Wintek Corporation, Taichung (TW)

( * ) Notice: Subject to any disclaimer, the term of this patent is extended or adjusted under 35 U.S.C. 154(b) by 159 days.

(21) Appl. No.: 12/170,918

(22) Filed: Jul. 10, 2008

(65) Prior Publication Data
US 2009/0015753 A1    Jan. 15, 2009

(30) Foreign Application Priority Data
Jul. 12, 2007   (TW) .............................. 96125382 A
Oct. 1, 2007    (TW) .............................. 96136697 A

(51) Int. Cl.
*G02F 1/1333* (2006.01)
(52) U.S. Cl. .......................................... 349/65; 362/31
(58) Field of Classification Search ............. 349/56.64, 349/65; 362/31, 555.559, 599, 620, 621
See application file for complete search history.

(56) References Cited

U.S. PATENT DOCUMENTS 6,144,491 A * 11/2000 Orikasa et al. .............. 359/452
6,601,962 B1 * 8/2003 Ehara et al. .................. 362/612
2003/0076669 A1   4/2003 Itoh et al.
2004/0252483 A1 * 12/2004 Cheng .......................... 362/31
2006/0039073 A1 * 2/2006 Lee et al. ..................... 359/599
2006/0268578 A1 * 11/2006 Zhu et al. .................... 362/618
2007/0115689 A1   5/2007 Yang
2007/0274100 A1 * 11/2007 Yang et al. .................. 362/615
2008/0151375 A1 * 6/2008 Lin ............................. 359/599
2008/0285309 A1 * 11/2008 Fang et al. .................. 362/620
2010/0079701 A1 * 4/2010 Murayama et al. ............ 349/64

FOREIGN PATENT DOCUMENTS
CN          1508603    6/2004
JP          2002-184225  6/2002

* cited by examiner

*Primary Examiner*—Akm E Ullah
(74) *Attorney, Agent, or Firm*—Muncy, Geissler, Olds & Lowe, PLLC

(57) ABSTRACT

A light guide plate that is divided into an effective section capable of providing uniform surface illumination and a transitional section between the effective section and the point light source includes a light-receiving surface, a light-emitting surface, a light-reflecting surface, and a plurality of light-diffusing structures. The light-diffusing structures are spread on the transitional section, and each light-diffusing structure is in the shape of a part elliptic cylinder having a long axis and a short axis and the front surface of the light-diffusing structure facing the point light source is a part elliptic cylindrical surface.

9 Claims, 24 Drawing Sheets

| Type of light-diffusing structure | Linear distance between the LED and the effective section (mm) | Brightness difference (cd/m^2) | Total luminous flux (W) | average brightness (cd/m^2) |
|---|---|---|---|---|
| Standard V-shaped | 4.65 | 189.15 | 0.087 | 65.78 |
| elliptical-shaped | 2.5 | 187.9 | 0.111 | 74.52 |
| elliptical-shaped | 3.0 | 182.72 | 0.111 | 76.1 |
| W-shaped | 2.5 | 189.06 | 0.113 | 75.48 |
| W-shaped | 3.0 | 164.47 | 0.112 | 76.89 |

FIG. 29

| Type of light-diffusing structure | Linear distance between the LED and the effective section (mm) | Brightness difference (cd/m^2) | Total luminous flux (W) | average brightness (cd/m^2) |
|---|---|---|---|---|
| Standard arc-shaped | 4.65 | 192.61 | 0.101 | 65.78 |
| embodiment shown in FIG. 15 | 3.5 | 185.3 | 0.103 | 72.83 |
| embodiment shown in FIG. 16 | 3 | 192.15 | 0.1 | 69.05 |

FIG. 30

LIGHT GUIDE PLACE AND LIGHT-DIFFUSING STRUCTURE THEREOF

CROSS REFERENCE TO RELATED APPLICATION

This application claims priority of applications No. 096125382 and No. 096136697 filed in Taiwan R.O.C on Jul. 12, 2007 and Oct. 1, 2007, respectively, under 35 U.S.C. §119; the entire contents of which are hereby incorporated by reference.

BACKGROUND OF THE INVENTION

1. Field of the Invention

The invention relates to a light-diffusing structure with excellent light diffusing effect and a light guide plate having enhanced luminous uniformity and light utilization efficiency.

2. Description of the Related Art

Generally, a linear light source, such as a cold cathode fluorescent lamp (CCFL) is not favorable for hand-held electronic devices due to its bulkiness. Instead, a point light source is typically used in a hand-held electronic device like a mobile phone and serves as the side light source for an LCD panel incorporated therein. FIG. 1 shows a schematic diagram illustrating a conventional backlight module 100. As shown in FIG. 1, a point light source like a light emitting diode (LED) 104 is next to a light-receiving surface 102a of a light guide plate 102, and its bottom surface 102c is provided with prismatic structures consisting of V-shaped grooves 106. As shown in FIG. 2, since the relationship between the light radiating angle and energy of a point light source follows Lambert's emission law, when an LCD panel uses the LED 104 as an side light source and a prism sheet (not shown) for guiding the light from the LED 104 toward the normal of a light-emitting surface 102b of the light guide plate 102, the distribution of bright bands 110 and dark bands 112 with sharp contrast always appear in a localized area near the light-receiving surface 102a. This tends to result in uneven brightness of the light guide plate 102.

Therefore, another design of light-diffusing structures is disclosed to solve the above problem. For example, as shown in FIG. 3, a plurality of triangular prism-like structures are arranged on the light-receiving surface 122 to form V-shaped structures 120. Alternatively, as shown in FIG. 4, a plurality of cylindrical prism-like structures are arranged on the light-receiving surface 132 to form arc-shaped structures 130. The light diffusing effect provided by these light guiding structures may obviate the uneven brightness of the light guide plate 102 and enhance light utilization efficiency. However, the conventional V-shaped structure 120 or arc-shaped structure 130 has limited light diffusing capability. Thus, even these light guiding structures are provided, the areas of bright/dark bands spread on the light guide plate 102 are still considerable. Thus, the brightness distribution is still not uniform and the areas of the effective section that provides uniform surface illumination of the light guide plate 102 cannot be further increased.

BRIEF SUMMARY OF THE INVENTION

The invention provides a light-diffusing structure with excellent light diffusing effect and a light guide plate having enhanced luminous uniformity, improved light utilization efficiency, and comparatively large effective areas for surface illumination.

According to an embodiment of the invention, a light guide plate, which is used for receiving and guiding the emitting light of at least one point light source and divided into an effective section capable of providing uniform surface illumination and a transitional section between the effective section and the point light source, includes a light-receiving surface, a light-emitting surface, a light-reflecting surface, and a plurality of light-diffusing structures. The light-receiving surface is next to the point light source for receiving the emitting light of the point light source, and the light-emitting surface makes an angle with the light-receiving surface. The light that propagates in the light guide plate exits the light guide plate through the light-emitting surface. The light-reflecting surface is positioned opposite the light-emitting surface for guiding the light that passes through the light-receiving surface to the light-emitting surface. The light-diffusing structures are spread on the transitional section, where each light-diffusing structure is in the shape of a part elliptic cylinder having a long axis and a short axis and the front surface of the light-diffusing structure facing the point light source is a part elliptic cylindrical surface.

According to another embodiment of the invention, a light guide plate includes a light-receiving surface, a light-emitting surface, a light-reflecting surface, a plurality of first light-diffusing structures, and a plurality of second light-diffusing structures. The first light-diffusing structures are spread on the transitional section and arranged in at least one row, where each light-diffusing structure is in the shape of a part elliptic cylinder and the front surface of the first light-diffusing structure facing the point light source is a part elliptic cylindrical surface. The second light-diffusing structures are spread on the transitional section and have a different dimension in relation to the first light-diffusing structures, where the second light-diffusing structures are arranged in the row of the first light-diffusing structures and alternate with the first light-diffusing structures.

According to another embodiment of the invention, the part elliptic cylindrical surface of each light-diffusing structure is provided with an indentation to form a W-shaped profile, and the cross section of the indentation cut along a direction parallel to the light-emitting surface is in the shape of a polygon, a part ellipse or a part circle.

According to the above embodiments, the geometrical profile of the elliptic cylindrical surface allows for comparatively large light deflecting distances; that is, the elliptical light-diffusing structure has better light-diffusing capability. Thus, the distance between the point light source and the effective section can be shortened, with the brightness uniformity still being accepted, to increase the area of the effective section on the light guide plate. Further, it is also clear that each two adjacent light-diffusing structures with different dimensions may achieve a greater degree of deflection on the propagation path of the incident light to thereby increase the light-diffusing effect. Besides, the indentation structure formed on part elliptic cylindrical surface of the light-diffusing structure also help to further enhance the light-diffusing capability.

Other objects and merits of the invention can be understood from the technical characteristics disclosed by the invention. In the "detailed description of the invention" section, embodiments together with drawings as examples are illustrated to further clarify the above objects, other objects, characteristics, and merits of the invention.

BRIEF DESCRIPTION OF THE DRAWINGS

FIG. 29 shows a comparison of measured values between different types of light-diffusing structures.

FIG. 30 shows another comparison of measured values between different types of light-diffusing structures.

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. In this regard, directional terminology is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
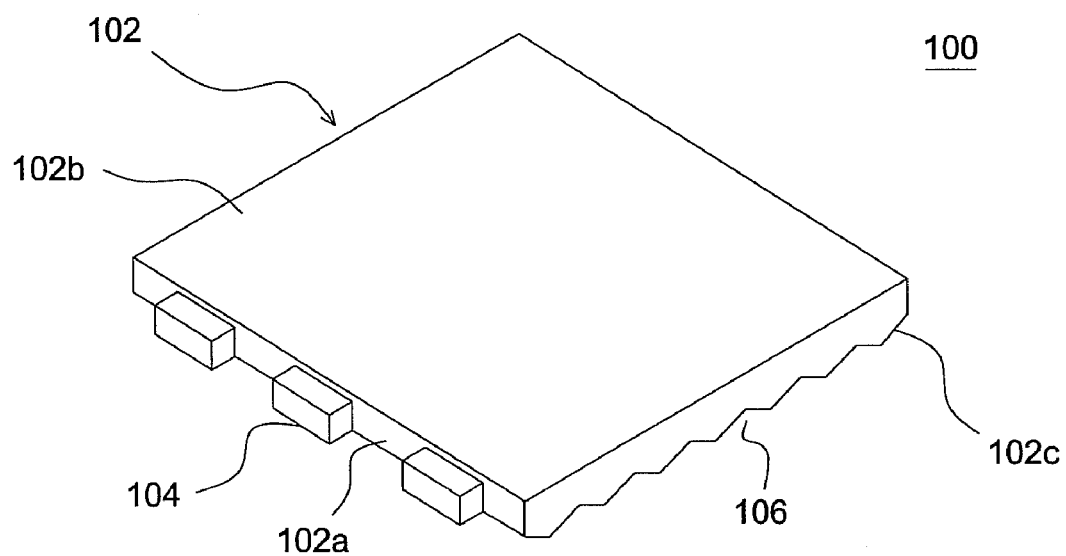
FIG. 1 shows a schematic diagram illustrating a conventional backlight module.
Figure 2:
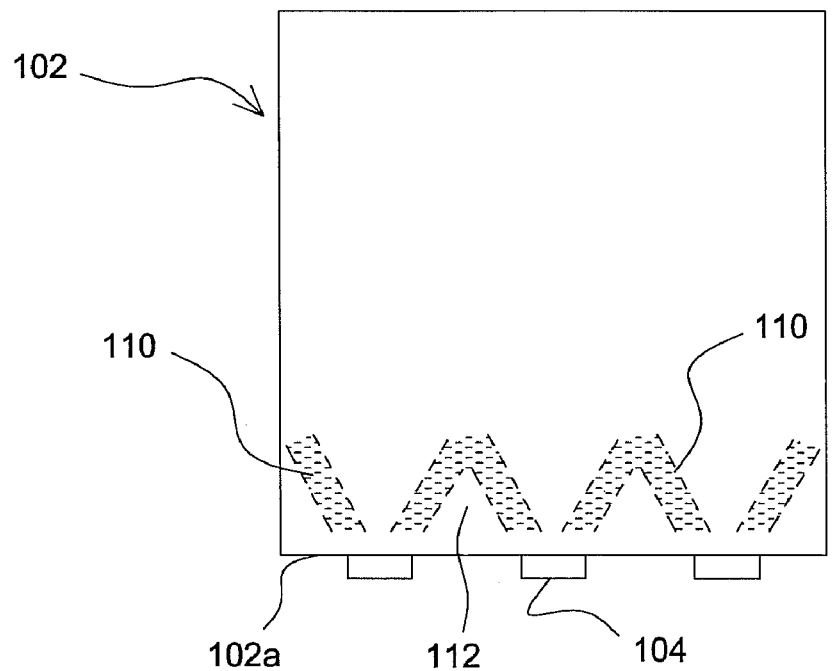
FIG. 2 shows a schematic diagram illustrating the distribution of bright/dark bands of a conventional light guide plate.
Figure 3:
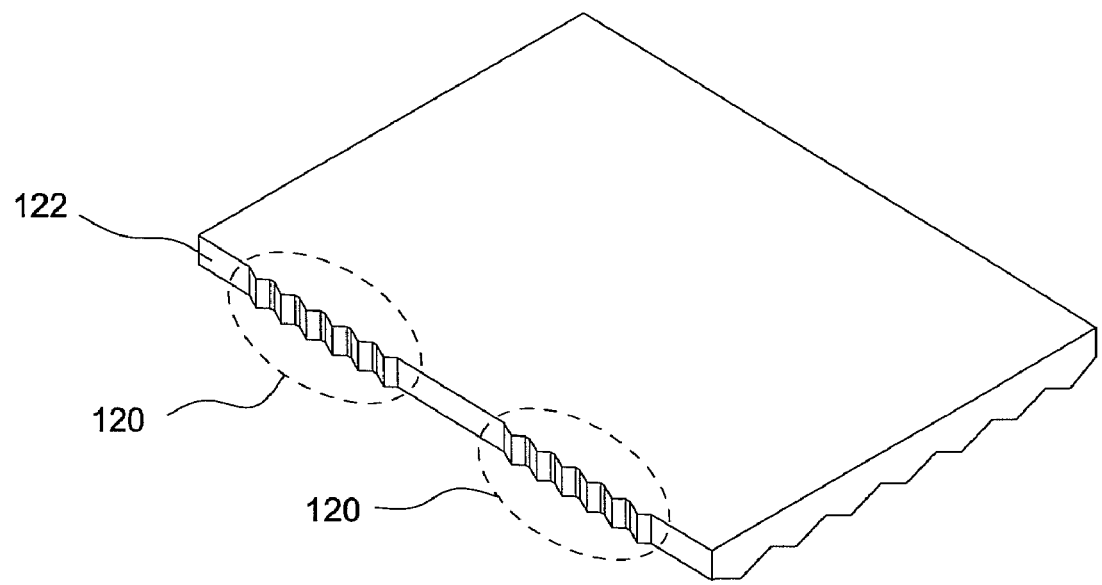
FIG. 3 shows a schematic diagram illustrating an embodiment of conventional light-diffusing structures.
Figure 4:
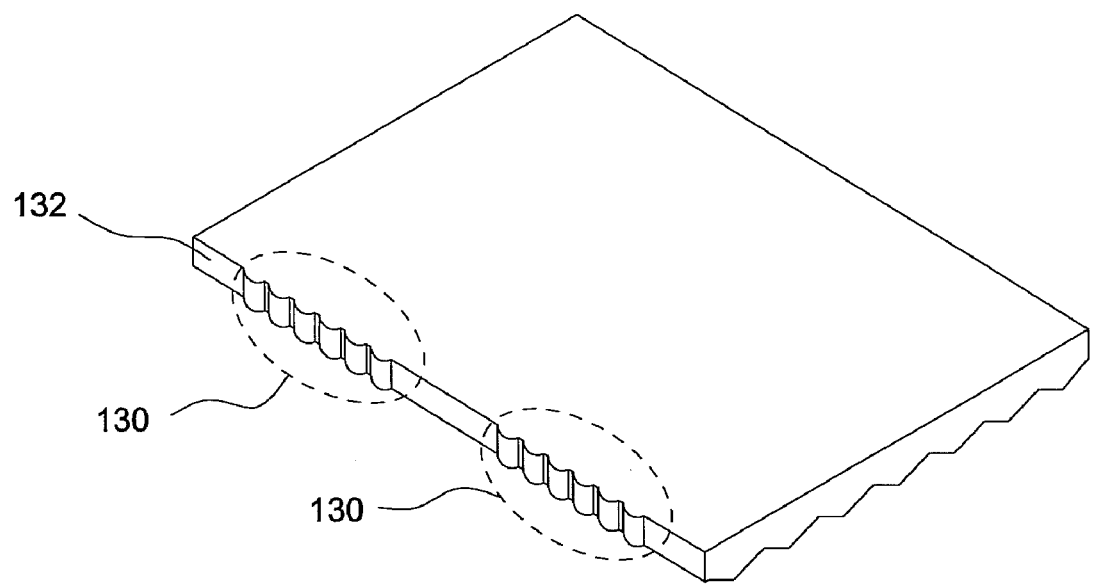
FIG. 4 shows a schematic diagram illustrating another embodiment of conventional light-diffusing structures.
Figure 5:
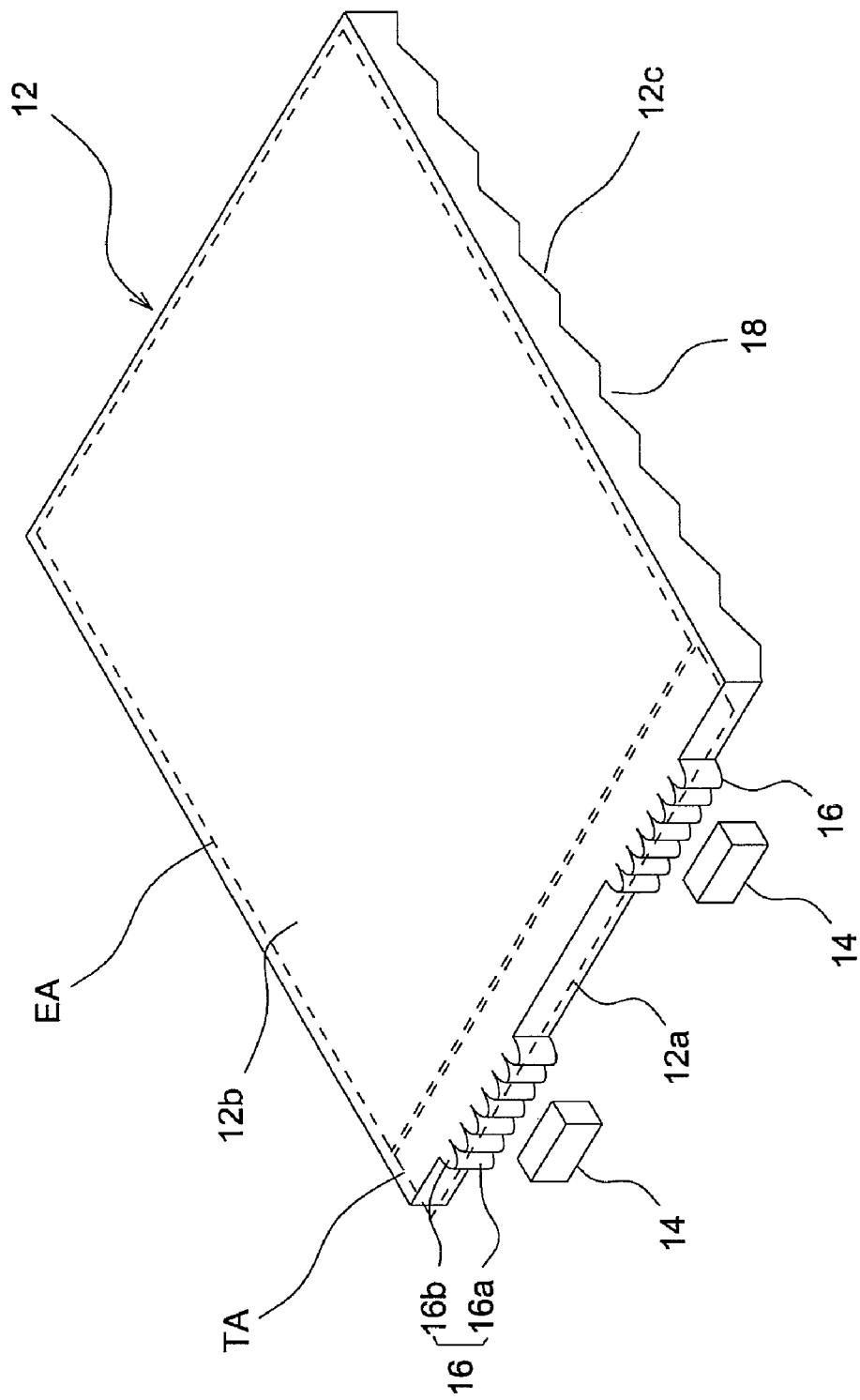
FIG. 5 shows a schematic diagram illustrating a light guide plate according to an embodiment of the invention.

FIG. 5 shows a schematic diagram illustrating a light guide plate according to an embodiment of the invention. As shown in FIG. 5, a light guide plate 12 is used to receive and guide the light from at least one point light source (such as two LEDs 14 shown in FIG. 5). The side surface of the light guide plate 12 next to the LED 14 forms a light-receiving surface 12a. The top surface of the light guide plate 12 that makes an angle with the light-receiving surface 12a forms a light-emitting surface 12b, and the bottom surface opposite the light-emitting surface 12b forms a light-reflecting surface 12c. The light-reflecting surface 12c is completely spread with a plurality of prismatic structures formed by V-shaped grooves 20, and the longitudinal directions of the V-shaped grooves 20 are parallel to each other. The light emitted from the LED 14 enters the light guide plate 12 via the light-receiving surface 12a and propagates inside the light guide plate 12. Then, it is guided toward the light-emitting surface 12b through the light-reflecting surface 12c and finally exits the light guide plate 12 through the light-emitting surface 12b.

Figure 6:
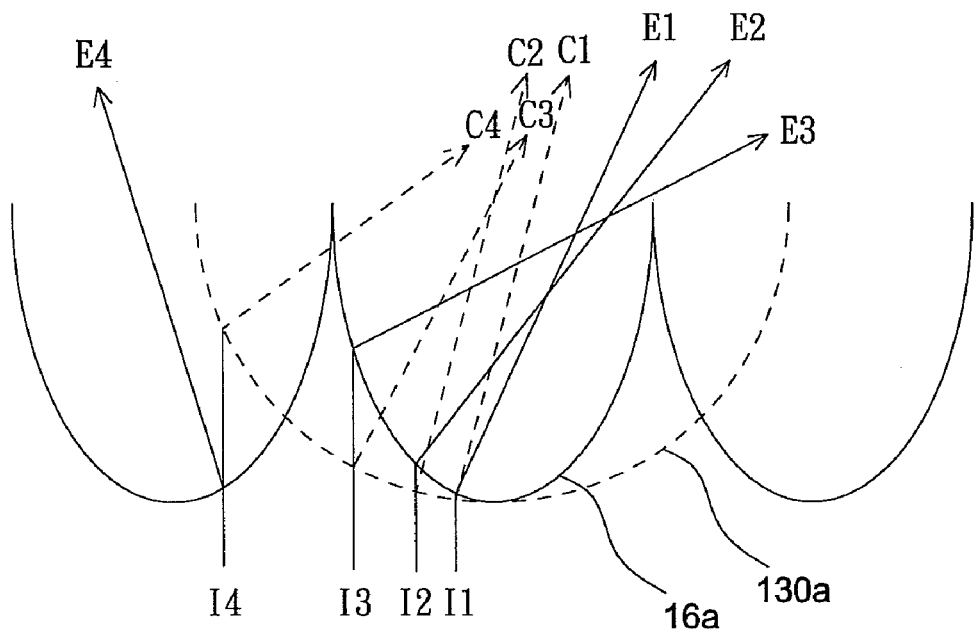
FIG. 6 shows a schematic diagram illustrating the better light-diffusing capability of an elliptical light-diffusing structure in relation to a conventional arc-shaped structure.
Figure 7:
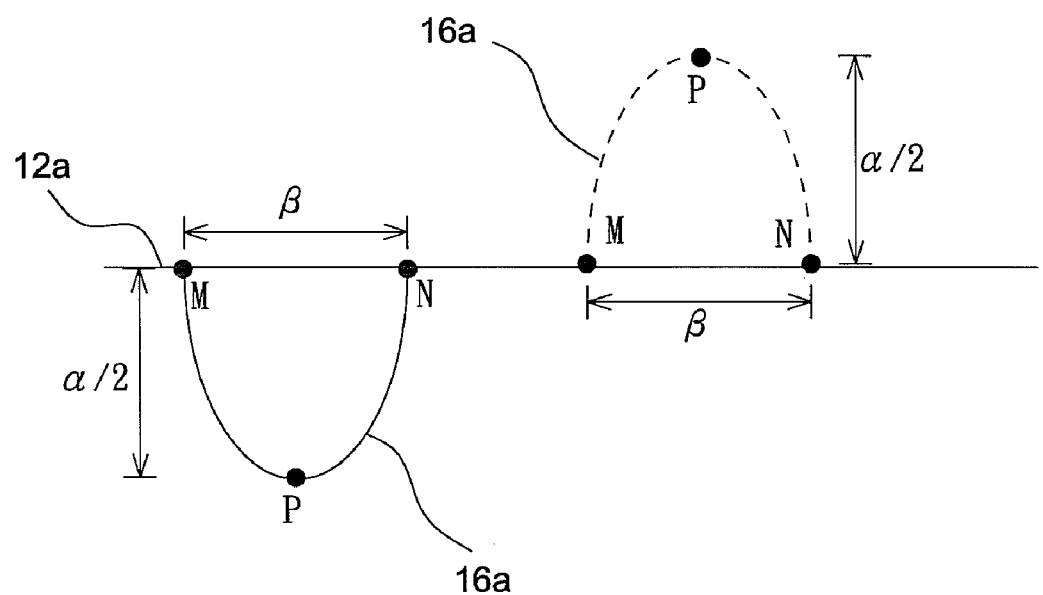
FIG. 7 shows a schematic diagram illustrating the trajectory of the elliptic cylindrical surface of the elliptical light-diffusing structure.
Figure 8A:
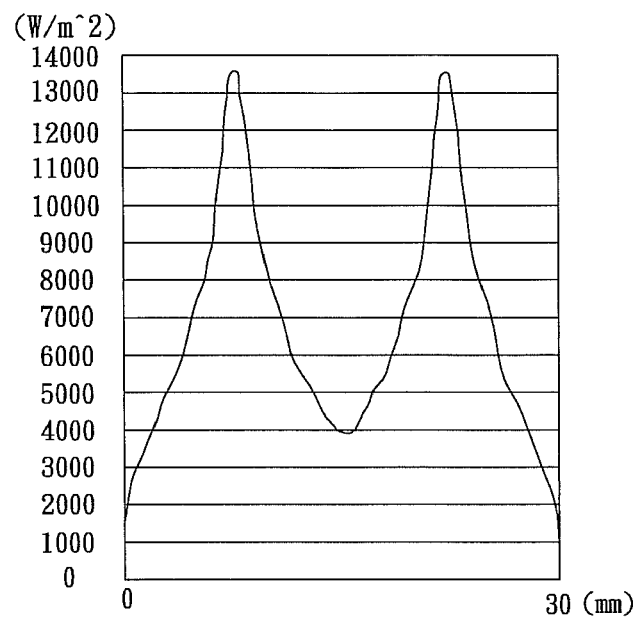
FIGS. 8A-9B show schematic diagrams illustrating the simulated light energy distributions by utilizing different light-diffusing structures.
Figure 8B:
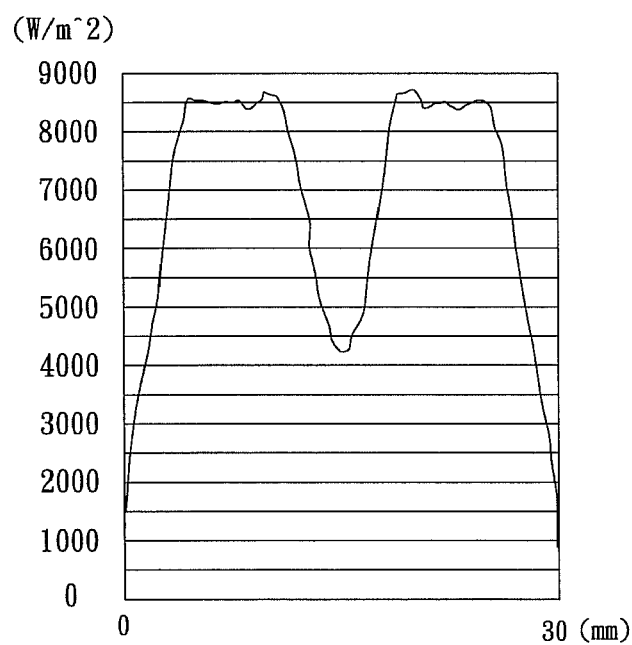

According to this embodiment, a plurality of elliptical light-diffusing structures 16 are arranged on the light-receiving surface 12a, with their longitudinal directions being parallel to each other. The distributed area of the elliptical light-diffusing structures 16 approximately overlaps a projection area on the light-receiving surface 12a where the emitting light of each LED 14 is projected. The front surface, facing the LED 14, of the elliptical light-diffusing structure 16 is a part elliptic cylindrical surface 16*a*, and the top surface 16*b* of the elliptical light-diffusing structure 16 has a profile of a part ellipse. FIG. 6 shows a schematic diagram illustrating the better light-diffusing capability of an elliptical light-diffusing structure in relation to a conventional arc-shaped structure. As shown in FIG. 6, after the incident lights I1-I4 hit the circular arc surface 130*a* of the arc-shaped structure, the lights I1-I4 are deflected to propagate at paths C1-C4 (dotted-lines). In comparison, after the incident lights I1-I4 hit the elliptic cylindrical surface 16*a* of the elliptical light-diffusing structure 16, the lights I1-I4 are deflected to propagate at paths E1-E4 (solid-lines). By comparing the deflecting distances from the paths I1-I4 to the paths C1-C4 with the deflecting distances from the paths I1-I4 to the paths E1-E4, it can be clearly seen that the geometrical profile of the elliptic cylindrical surface 16*a* allows for more light deflecting distances; that is, the elliptical light-diffusing structure 16 has better light-diffusing capability. As shown in FIG. 7, according to the embodiment, the trajectory of the elliptic cylindrical surface 16*a* follows the equation: $(X^2/\alpha^2)+(Y^2/\beta^2)=1$, where $\alpha$ is the long axis length, $\beta$ is the short axis length, and $\alpha \neq \beta$. In addition, referring to FIG. 7, when the distance from the light-receiving surface 12*a* to the point P on the elliptic cylindrical surface 16*a*, which is the farthest point apart from the light-receiving surface 12*a*, is set to be larger than the intercept between two points M and N at which the light-receiving surface 12*a* is intersected with the elliptic cylindrical surface 16*a*, a better light-diffusing effect can be achieved.

Referring to FIG. 5 again, in case a point light source is used as the side light source, the light guide plate is divided into an effective section EA and a transitional section TA. The transitional section TA is next to the point light source and has a bright/dark band distribution with sharp contrast, and the brightness uniformity in the transitional section TA is unable to be compensated by altering the dimension and density of dots, so the transitional section TA is a blank region without the formation of dots and fails to provide uniform surface illumination. In comparison, the lights are diffused and become uniform in the effective section EA, so the effective section EA is capable of providing uniform surface illumination and is positioned to overlap the active area (AA) of an LCD panel. In the case of using conventional V-shaped structures in a 1.8 inch standard backlight module, when the LED is apart from the effective section EA with a distance of 4.65 mm, the brightness difference between bright bands and dark bands in the front of the light guide plate is 189.15 cd/m$^2$, which is considered as an upper limit for acceptable values. In other words, if the brightness difference in the front of the light guide plate is larger than 189.15 cd/m$^2$, the brightness uniformity is considered not good. Besides, as the distance between the point light source and the effective section EA is shortened, the brightness difference in the front of the light guide plate becomes larger correspondingly. Therefore, by the excellent light-diffusing effect of the elliptical light-diffusing structure 16, the distance between the point light source and the effective section EA can be shortened with the brightness uniformity still being accepted (smaller than the acceptable upper limit 189.15 cd/m$^2$), so as to increase the area of the effective section EA on the light guide plate.

Figure 9A:
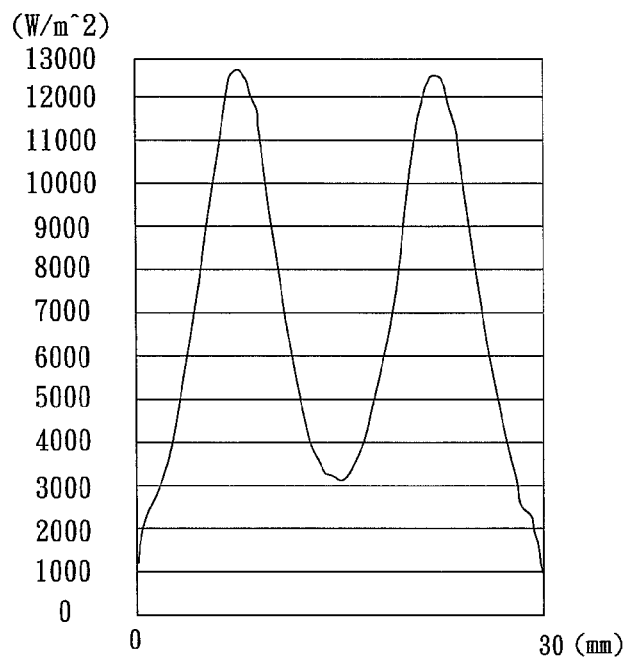
Figure 9B:
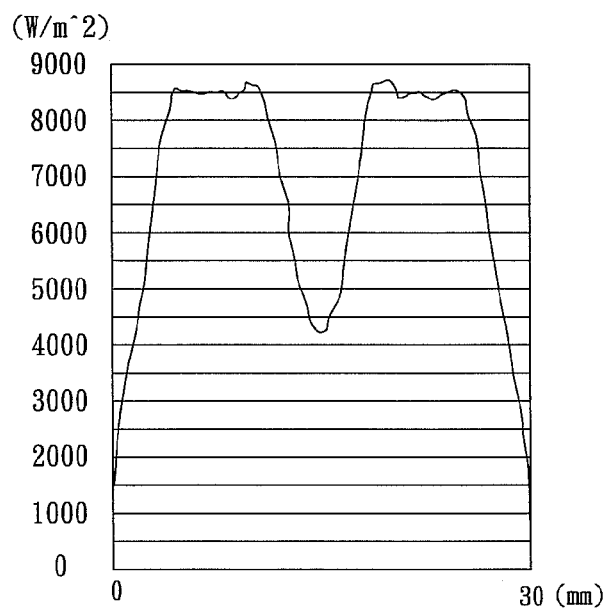

FIGS. 8A-9B show schematic diagrams illustrating the simulated light energy distributions by utilizing different light-diffusing structures, under the condition that the distance between the point light source and the effective section is 4.65 mm. Comparing FIG. 8A with FIG. 8B, it can be seen that the peak in FIG. 8B appears to be a flat trapezoid while the peak in FIG. 8A appears to be a sharp triangle. Thus, the light-diffusing capability of an elliptical light-diffusing structure 16 reflected in FIG. 8B is better than that of a V-shaped structure reflected in FIG. 8A. Similarly, comparing FIG. 9A with FIG. 9B, it can be seen that the peak in FIG. 9B appears to be a flat trapezoid while the peak in FIG. 9A appears to be a sharp triangle. Thus, the light-diffusing capability of an elliptical light-diffusing structure 16 reflected in FIG. 9B is better than that of an arc-shaped structure reflected in FIG. 9A. Thus, the excellent light-diffusing effect of the elliptical light-diffusing structure 16 allows for a reduction of the transitional section TA; in other words, the area of the effective section EA on the light guide plate is increased to enhance light utilization efficiency.

Figure 10:
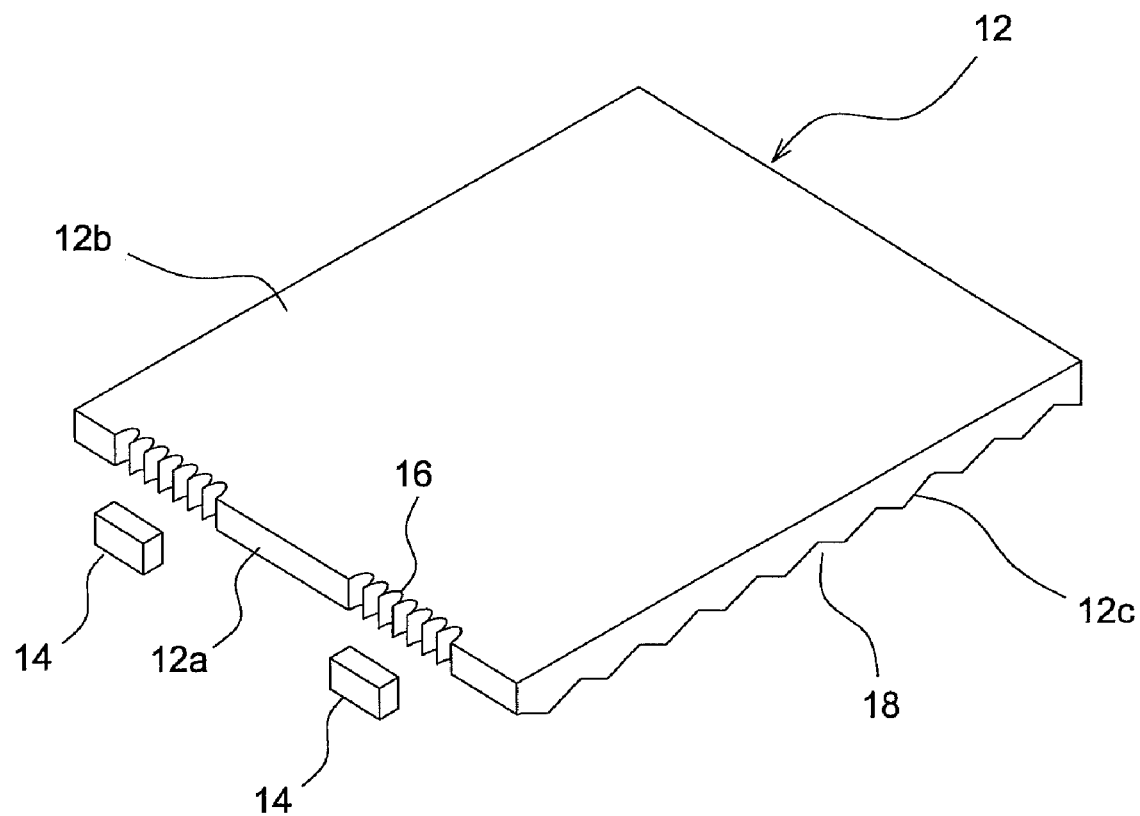
FIG. 10 shows a schematic diagram illustrating elliptical light-diffusing structures according to another embodiment of the invention.
Figure 11:
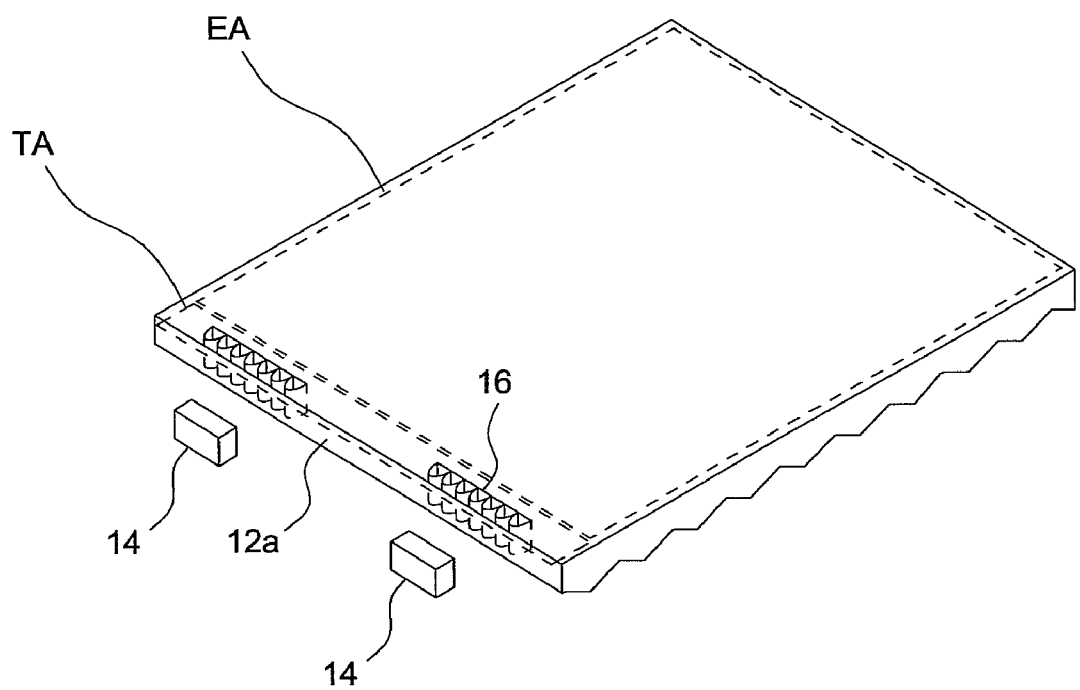
FIG. 11 shows a schematic diagram illustrating elliptical light-diffusing structures according to another embodiment of the invention.
Figure 12:
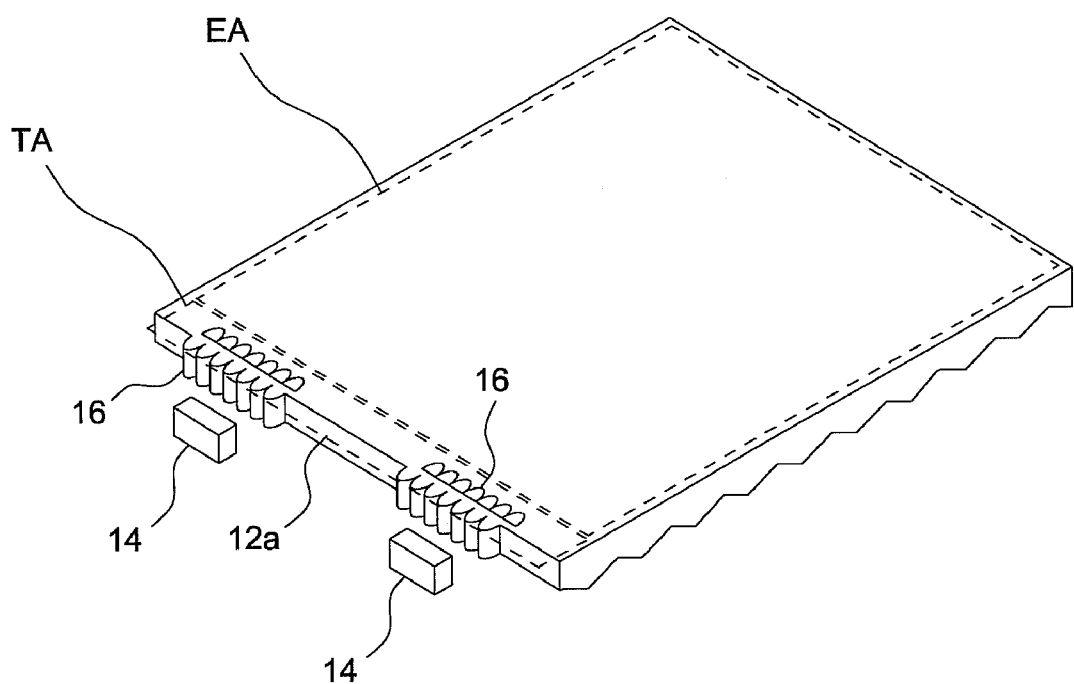
FIG. 12 shows a schematic diagram illustrating elliptical light-diffusing structures according to another embodiment of the invention.

Though each elliptical light-diffusing structure 16 shown in FIG. 5 is a bump structure protruded from the light guide plate, this is not limited. In an alternate embodiment shown in FIG. 10, each elliptical light-diffusing structure 16 formed on the light-receiving surface 12*a* is a notch indented on the light-receiving surface 12*a* of the light guide plate 12. Further, the elliptical light-diffusing structure 16 is not limited to be formed on the light-receiving surface 12*a*. For example, as shown in FIG. 11, a plurality of notches in the shape of an elliptical light-diffusing structure are formed inside the transitional section TA and arranged in two rows that are respectively corresponding to the two LED 14 positioned side by side. Note that the light-diffusing effect can be achieved even only one elliptical light-diffusing structure 16 is provided. Besides, as shown in FIG. 12, the elliptical light-diffusing structures 16 are formed on both the light-receiving surface 12*a* and the transitional section TA except for the light-receiving surface 12*a* to further increase the light-diffusing effect. Moreover, in the embodiment shown in FIG. 12, the part elliptic cylindrical surface of the elliptical light-diffusing structure 16 formed on the light-receiving surface 12*a* points toward the LED 14 while the part elliptic cylindrical surface of the notch formed on the transitional section TA except for the light-receiving surface 12*a* points away from the LED 14. However, it is not limited to such configuration but depends on the desired light-diffusing effect.

Figure 13:
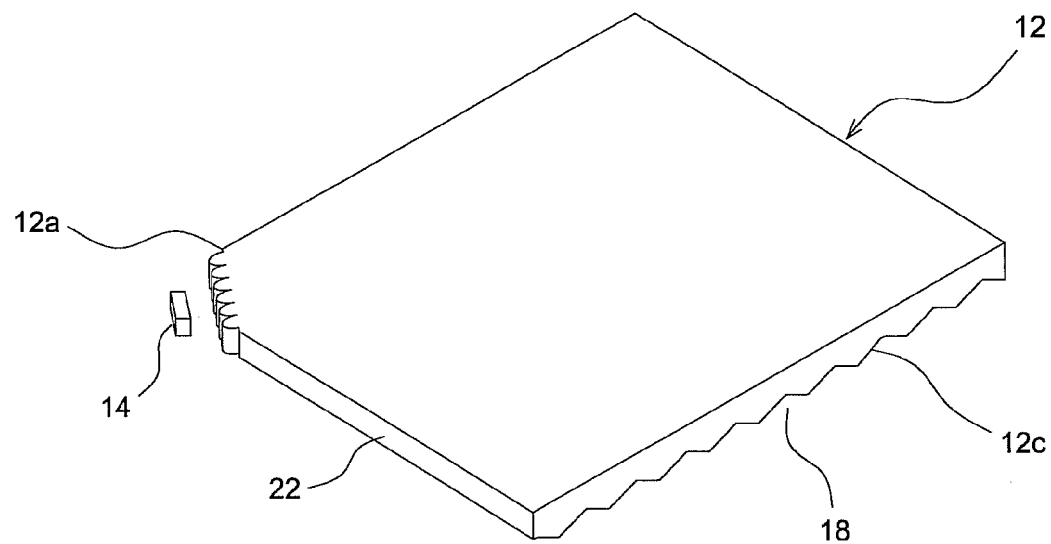
FIG. 13 shows a schematic diagram illustrating an elliptical light-diffusing structure according to another embodiment of the invention.
Figure 14:
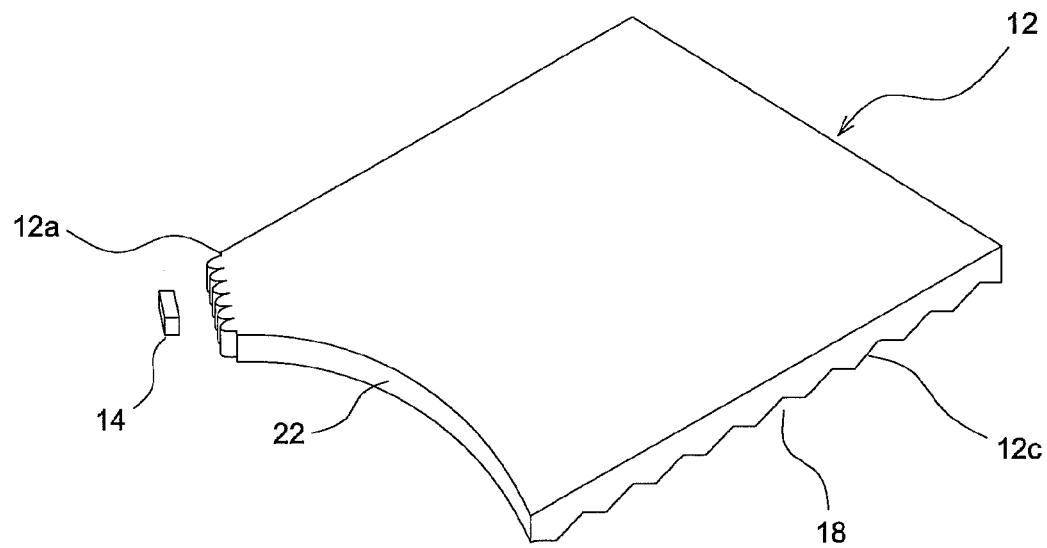
FIG. 14 shows a schematic diagram illustrating elliptical light-diffusing structures according to another embodiment of the invention.

FIG. 13 shows a schematic diagram illustrating an elliptical light-diffusing structure according to another embodiment of the invention. As shown in FIG. 13, in the case of using a single LED 14 as the side light source, the LED 14 can be positioned next to one corner portion of the light guide plate 12. The corner portion of the light guide plate 12 is cut off to form the light-receiving surface 12*a* on which the elliptical light-diffusing structures 16 spread. Further, the side surface 22 that is adjacent to the light-receiving surface 12*a* of the light guide plate 12 may be a planar surface shown in FIG. 13 or a curved surface shown in FIG. 14.

Figure 15:
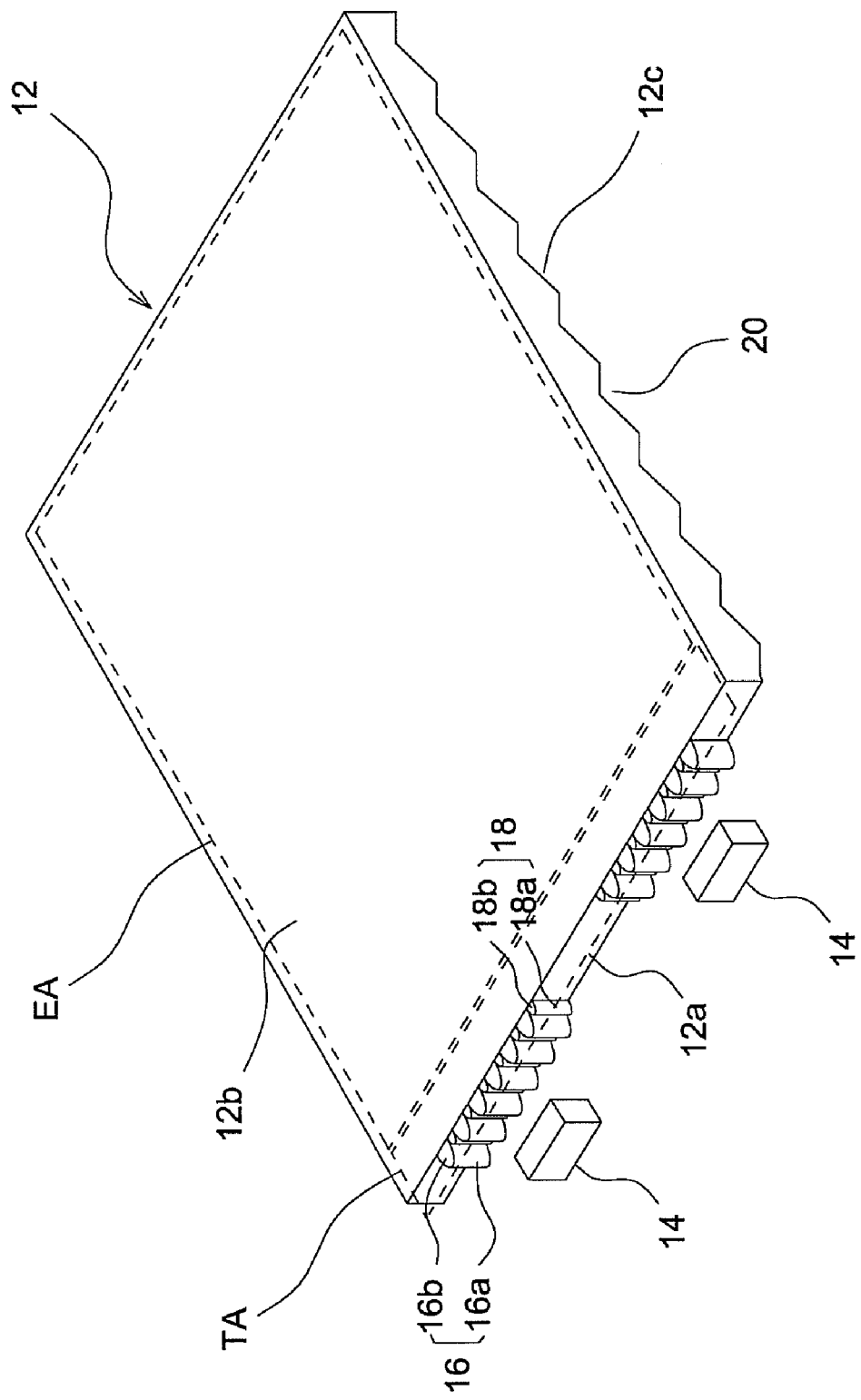
FIG. 15 shows a schematic diagram illustrating the design of a light guide plate according to another embodiment of the invention.

The following describes the design for further increasing the light-diffusing effect. As shown in FIG. 15, according to this embodiment, the elliptical light-diffusing structures 16 and 18 with two different dimensions are formed on the light-receiving surface 12*a*. The elliptical light-diffusing structures 16 and 18 with two different dimensions are alternately arranged on the light-receiving surface 12*a*, with their longitudinal directions being parallel to each other. The front surfaces, facing the LED 14, of the elliptical light-diffusing structures 16 and 18 are part elliptic cylindrical surfaces 16*a* and 18*a*, and the top surfaces 16*b* and 18*b* of the elliptical light-diffusing structures 16 and 18 have profiles of a part ellipse. According to this embodiment, in each two adjacent light-diffusing structures, the dimension ratio Rd is defined as the area of the top surface 16*b* of the light-diffusing structure 16 with a larger dimension to the area of the top surface 18*b* of the light-diffusing structure 18 with a smaller dimension, and the dimension ratio Rd is preferably within a range of 1.2 to 35.

Figure 16:
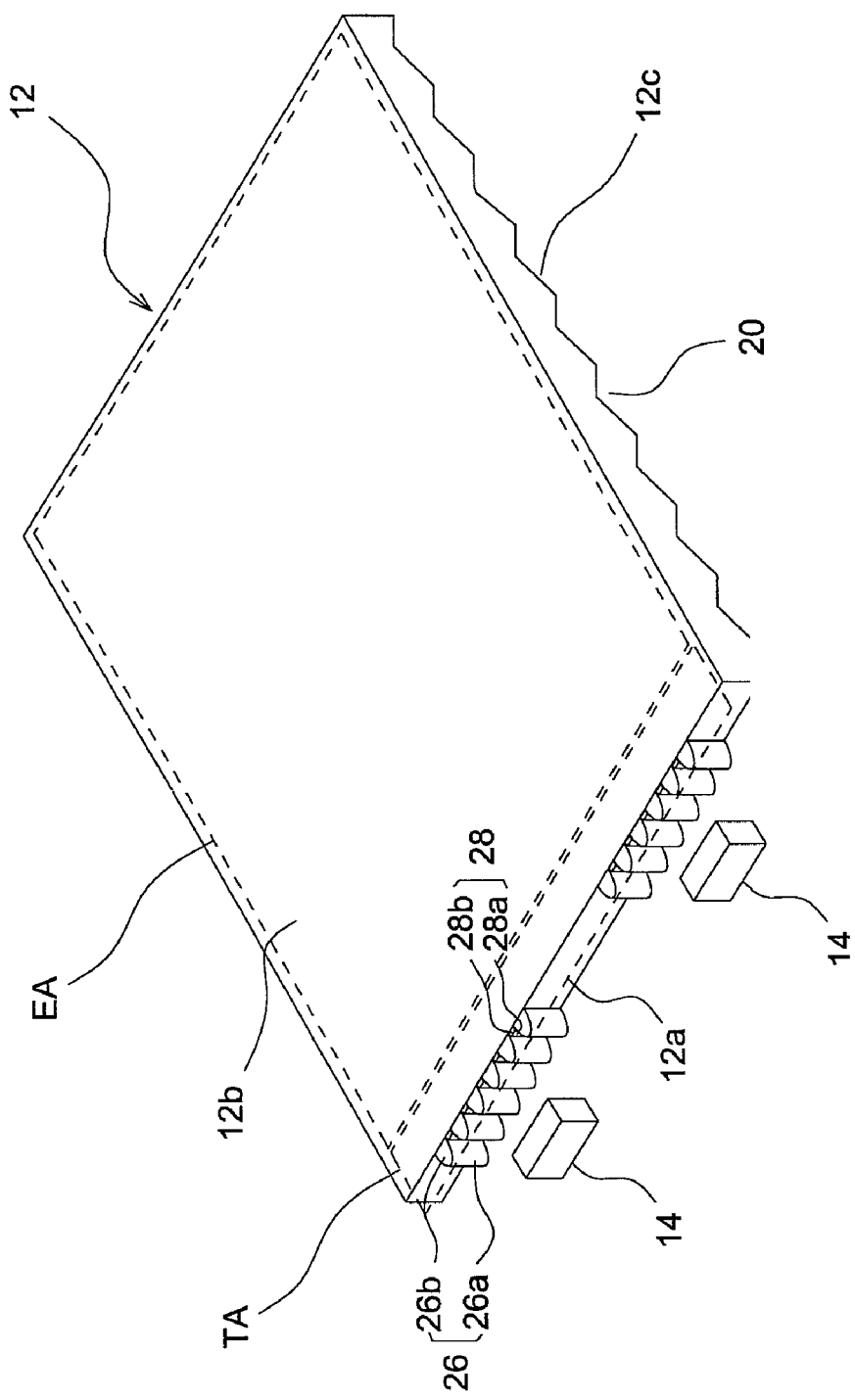
FIG. 16 shows a schematic diagram illustrating the design of a light guide plate according to another embodiment of the invention.

FIG. 16 shows a schematic diagram illustrating the design of a light guide plate according to another embodiment of the invention. As shown in FIG. 16, the light-diffusing structures with two different dimensions are alternately arranged on the light-receiving surface 12a. The light-diffusing structure with a larger dimension is an elliptical light-diffusing structure 26 while the light-diffusing structure with a smaller dimension is a V-shaped structure 28. The front surface, facing the LED 14, of the elliptical light-diffusing structure 26 is a part elliptic cylindrical surface 26a and the top surface 26b of the elliptical light-diffusing structure 26 has a profile of a part ellipse. The front surface, facing the LED 14, of the V-shaped structure 28 is a side surface 28a of a prism and the top surface 28b has a profile of a trapezoid. According to this embodiment, in each two adjacent light-diffusing structures, the dimension ratio Rd is defined as the area of the top surface 26b of the elliptical light-diffusing structure with a larger dimension to the area of the top surface 28b of the V-shaped structure with a smaller dimension, and the dimension ratio Rd is preferably within a range of 1.2 to 35.

Figure 17A:
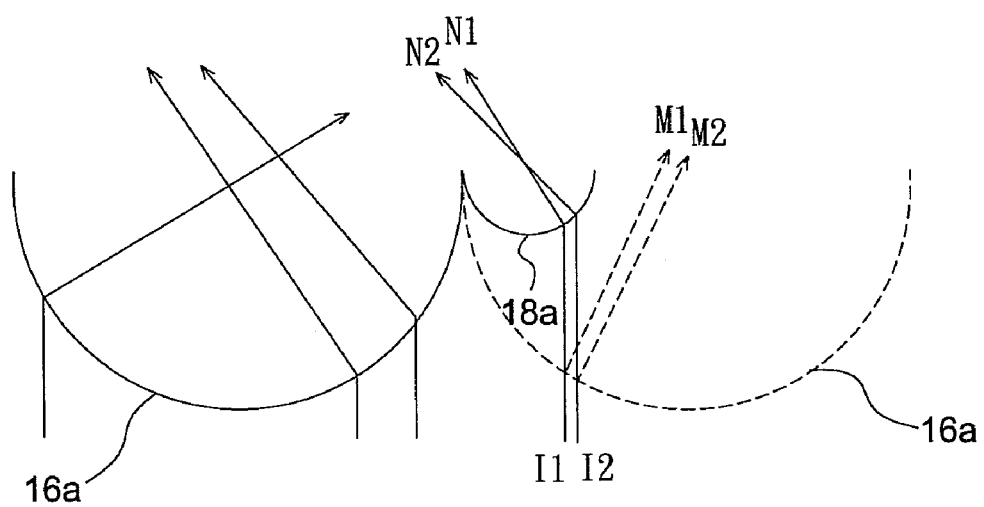
FIGS. 17A and 17B show schematic diagrams illustrating the better light-diffusing effect by providing light-diffusing structures with different dimensions.
Figure 17B:
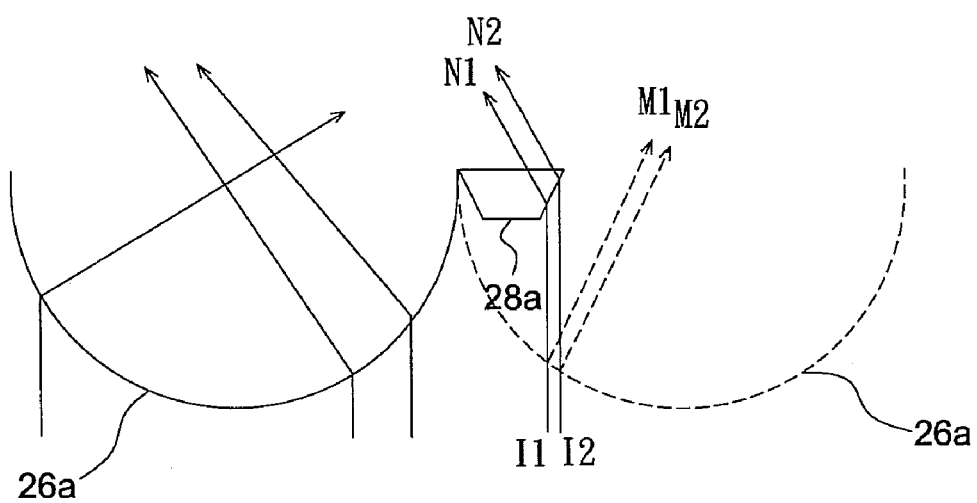

FIGS. 17A and 17B show schematic diagrams illustrating the better light-diffusing effect by providing light-diffusing structures with different dimensions. As shown in FIG. 17A, the paths M1, M2 (dotted lines) are the propagation paths of the incident lights I1, I2 that hit the arc surface 16a of a light-diffusing structure in the right-hand side having a dimension same as that in the left-hand side. The paths N1, N2 (solid lines) are the propagation paths of the incident lights I1, I2 that hit the arc surface 18a of the light-diffusing structure in the right-hand side having a dimension smaller than that in the left-hand side. It is clear from the comparison between the paths M1, M2 and the paths N1, N2 that each two adjacent light-diffusing structures with different dimensions achieve a greater degree of deflection on the propagation path of the incident light to thereby increase the light-diffusing effect. Similarly, as shown in FIG. 17B, the paths M1, M2 (dotted lines) are the propagation paths of the incident lights I1, I2 that the incident lights I1, I2 hit the arc surface 16a of the light-diffusing structure in the right-hand side having a dimension same as that in the left-hand side. The paths N1, N2 (solid lines) are the propagation paths of the incident lights I1, I2 that the incident lights I1, I2 hit the prism surface 28a of the light-diffusing structure in the right-hand side having a dimension smaller than that in the left-hand side. It is also clear from the comparison between the paths M1, M2 and the paths N1, N2 that each two adjacent light-diffusing structures with different dimensions achieve a greater degree of deflection on the propagation path of the incident light to thereby increase the light-diffusing effect.

Referring to FIG. 15 again, in the condition of using a point light source as the side light source, the light guide plate 12 is also divided into an effective section EA and a transitional section TA. The transitional section TA is next to the point light source and has a bright/dark band distribution with sharp contrast, so the transitional section TA is a blank region without the formation of dots and fails to provide uniform surface illumination. In comparison, the lights are diffused and become uniform in the effective section EA, so the effective section EA is capable of providing uniform surface illumination and is positioned to overlap the active area (AA) of an LCD panel. In the case of using conventional arc-shaped structures in a 1.8 inch standard backlight module, when the LED is apart from the effective section EA with a distance of 4.65 mm, the brightness difference between bright bands and dark bands in the front of the light guide plate is 192.61 cd/m$^2$, which is considered as an upper limit for acceptable values. In other words, if the brightness difference in the front of the light guide plate is larger than 192.61 cd/m$^2$, the brightness uniformity is considered not good. Further, if the distance between the point light source and the effective section EA is shortened, the brightness difference in the front of the light guide plate becomes larger correspondingly. Therefore, through the excellent light-diffusing effect achieved by alternately providing the light-diffusing structures with two different dimensions, the distance between the point light source and the effective section EA can be shortened, with the brightness uniformity still being accepted (smaller than the acceptable upper limit 192.61 cd/m$^2$), so as to increase the area of the effective section EA on the light guide plate.

Figure 18A:
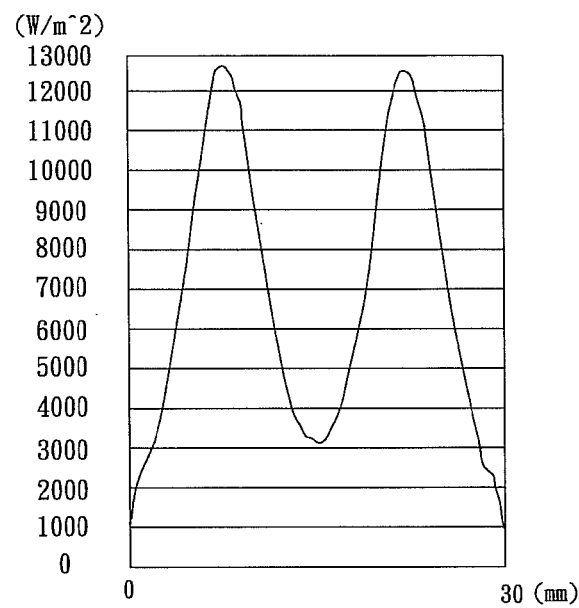
FIGS. 18A-19B show schematic diagrams illustrating the simulated light energy distributions by utilizing light-diffusing structures with different dimensions.
Figure 18B:
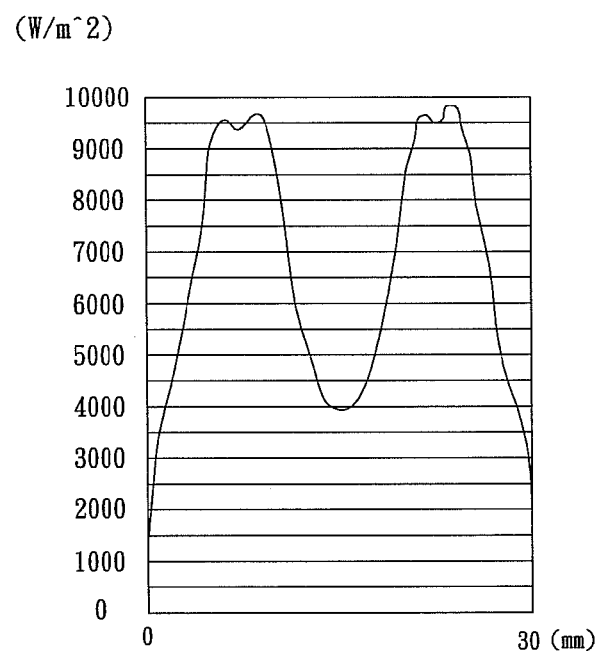
Figure 19A:
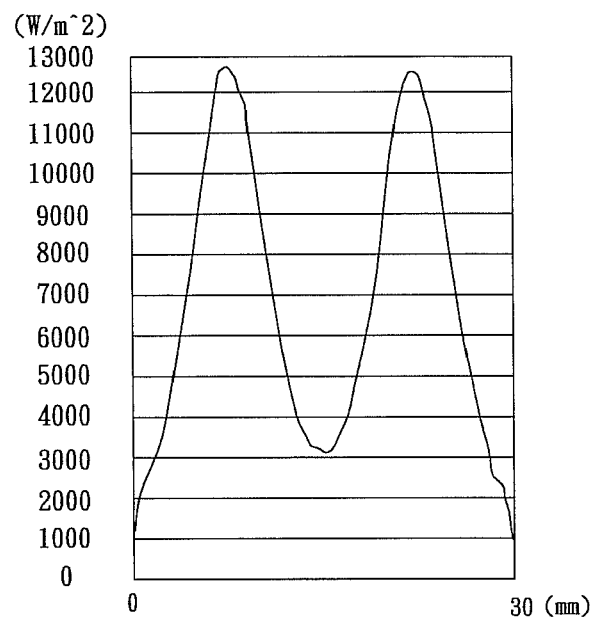
Figure 19B:
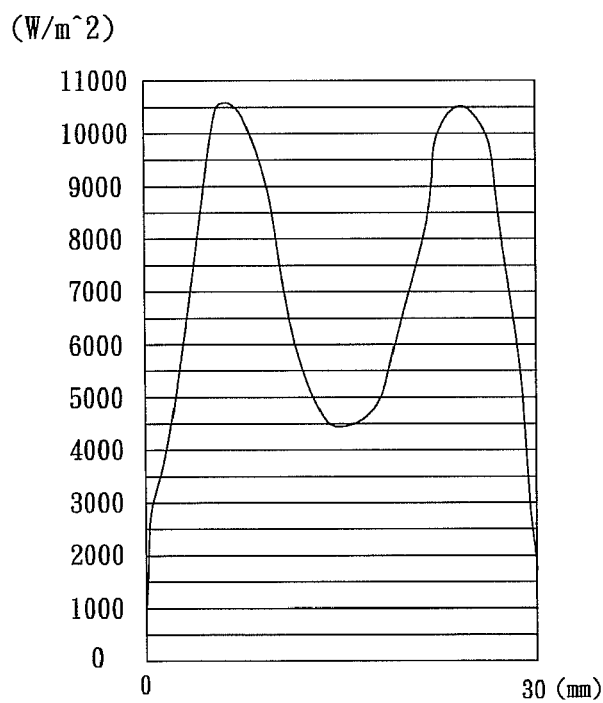

FIGS. 18A-19B show schematic diagrams illustrating the simulated light energy distributions by utilizing light-diffusing structures with different dimensions, under the condition that the distance between the point light source and the effective section is 4.65 mm. FIG. 18A shows the simulation result for conventional arc-shaped structures with identical dimensions while FIG. 18B shows the simulation result for elliptical light-diffusing structures 16 with two different dimensions. Comparing FIG. 18A with FIG. 18B, it is shown that the peak in FIG. 18B appears to be a flat trapezoid while the peak in FIG. 18A appears to be a sharp triangle. Besides, the brightness difference between the peak and valley in FIG. 18B is clearly smaller than that in FIG. 18A. Thus, the elliptical light-diffusing structures 16 with two different dimensions have better light-diffusing capability than the arc-shaped structures with identical dimensions. FIG. 19A shows the simulation result for the conventional arc-shaped structures with identical dimensions while FIG. 19B shows the simulation result for alternately arranged V-shaped structures and elliptical light-diffusing structures having their respective dimensions. Similarly, comparing FIG. 19A with FIG. 19B, the brightness difference between the peak and valley in FIG. 19B is clearly smaller than that in FIG. 19A. Thus, the alternately arranged conventional V-shaped structure and the elliptical light-diffusing structures having their respective dimensions have better light-diffusing capability than the conventional arc-shaped structures with identical dimensions. Therefore, the excellent light-diffusing effect of the alternately arranged light-diffusing structures having different dimensions allows for the reduction of the transitional section TA. In other words, the area of the effective section EA on the light guide plate can be considerably increased.

Figure 20A:
FIGS. 20A-20D show schematic diagrams illustrating different shapes of the of light-diffusing structures according to the invention.
Figure 20B:
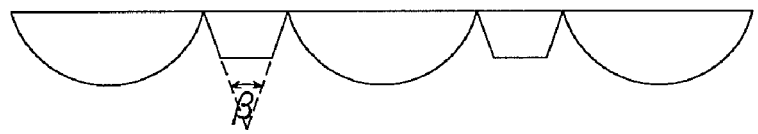
Figure 20C:
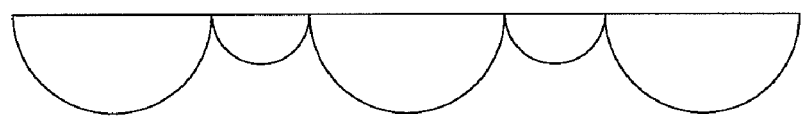
Figure 20D:

Moreover, the excellent light-diffusing effect can be achieved just by setting the light-diffusing structures arranged in substantially the same direction to have different dimensions, and the cross section of the light-diffusing structure is not limited to a specific shape. In one embodiment, in each two adjacent light-diffusing structures, the cross section of the light-diffusing structure with a larger dimension cut along the direction parallel to the light-emitting surface 12b is a curved surface while the cross section of the light-diffusing structure with a smaller dimension cut along the same direction is in the shape of a polygon. For example, a semicircle associates with a triangle (FIG. 20A), or a bow-shaped surface associates with a trapezoid (FIG. 20B). In another embodiment, the cross sections of the two adjacent light-diffusing structures with two different dimensions can be both curved surfaces. For example, a large semicircle associates with a small semicircle (FIG. 20C), or an arc surface without a constant curvature associates with a bow-shaped surface (FIG. 20D). In addition, in case the cross section is in the shape of a part circle, a part ellipse or a segment, the curvature radius is preferably between 1 μm and 2000 μm. Further, in case the cross section is in the shape of a triangle or a trapezoid, the vertex angle α of the triangle next to the point light source (FIG. 20A) and the included angle β formed by the two sides of the trapezoid extending toward the point light source (FIG. 20B) are both preferably between 2 degrees and 150 degrees.

Figure 21:
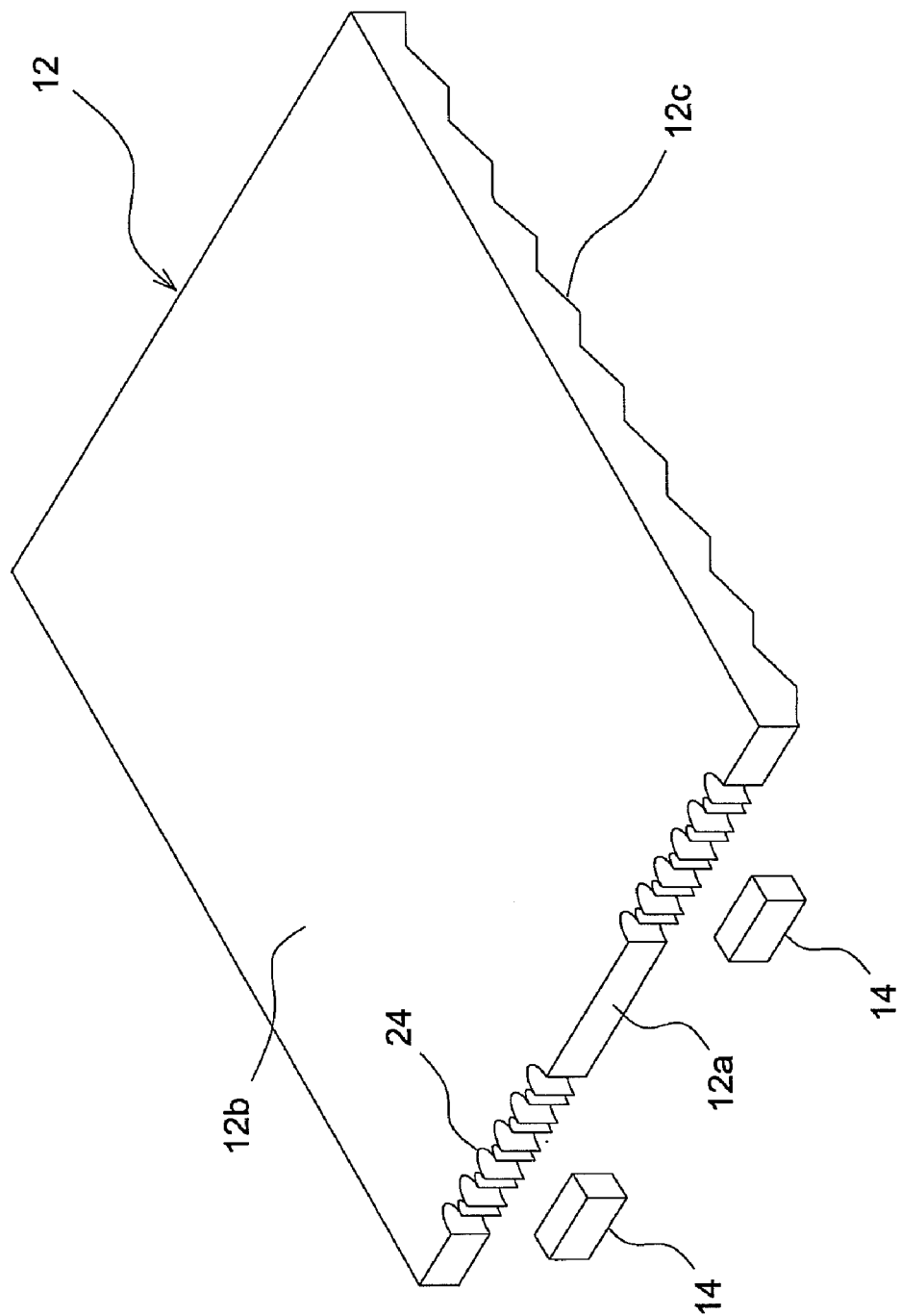
FIG. 21 shows a schematic diagram illustrating light-diffusing structures according to another embodiment of the invention.
Figure 22:
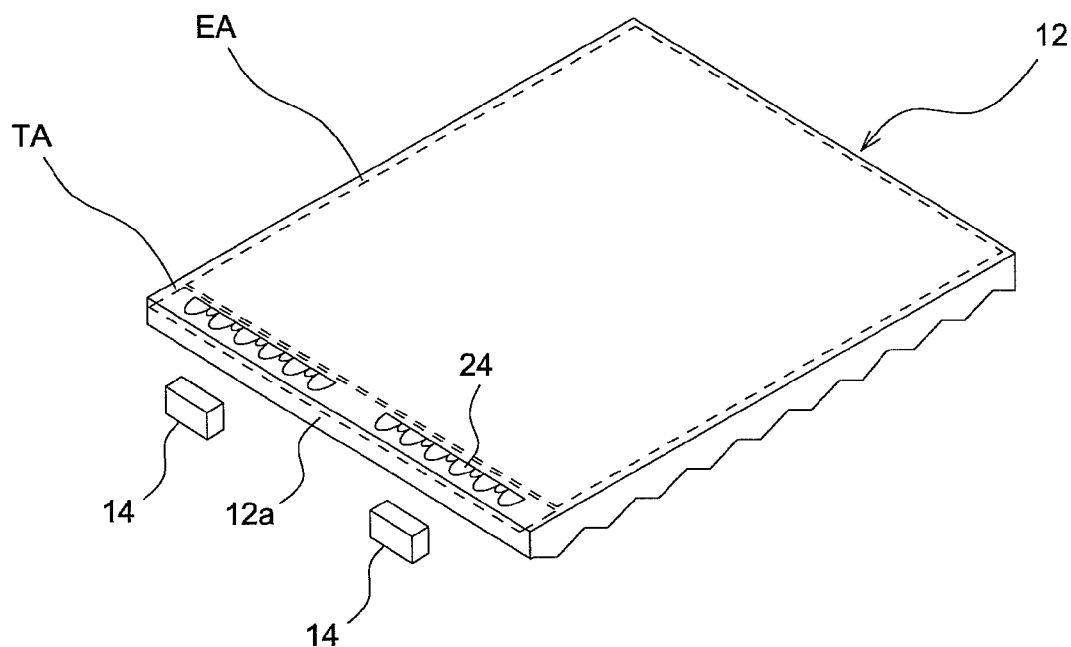
FIG. 22 shows a schematic diagram illustrating light-diffusing structures according to another embodiment of the invention.
Figure 23:
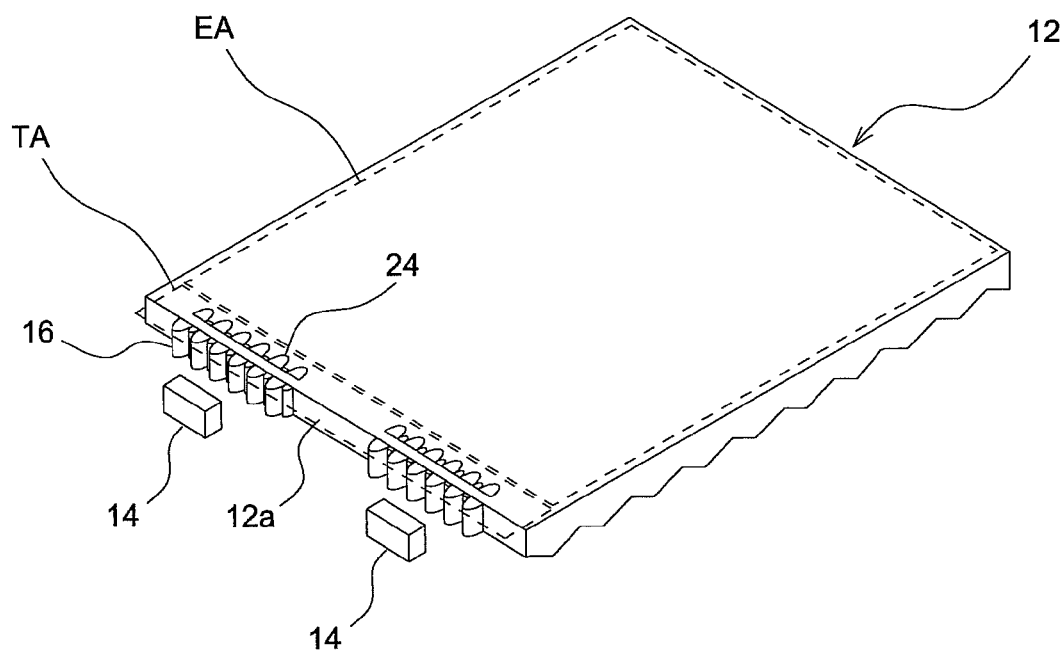
FIG. 23 shows a schematic diagram illustrating light-diffusing structures according to another embodiment of the invention.

In one embodiment, as shown in FIG. 21, the light-diffusing structures that have two different dimensions are notches 24 indented on the light-receiving surface 12a rather than bump structures protruded from the light-receiving surface 12a of the light guide plate 12 shown in FIG. 15. Further, the light-diffusing structures having two different dimensions are not confined to be formed on the light-receiving surface 12a. For example, as shown in FIG. 22, a plurality of notches having two different dimensions are formed on the transitional section TA except for the light-receiving surface 12a and arranged in two rows that are respectively corresponding to the two LED 14 positioned side by side. Besides, as shown in FIG. 23, the light-diffusing structures having two different dimensions are formed on both the light-receiving surface 12a and the transitional section TA except for the light-receiving surface 12a to further increase the light-diffusing effect.

Figure 24:
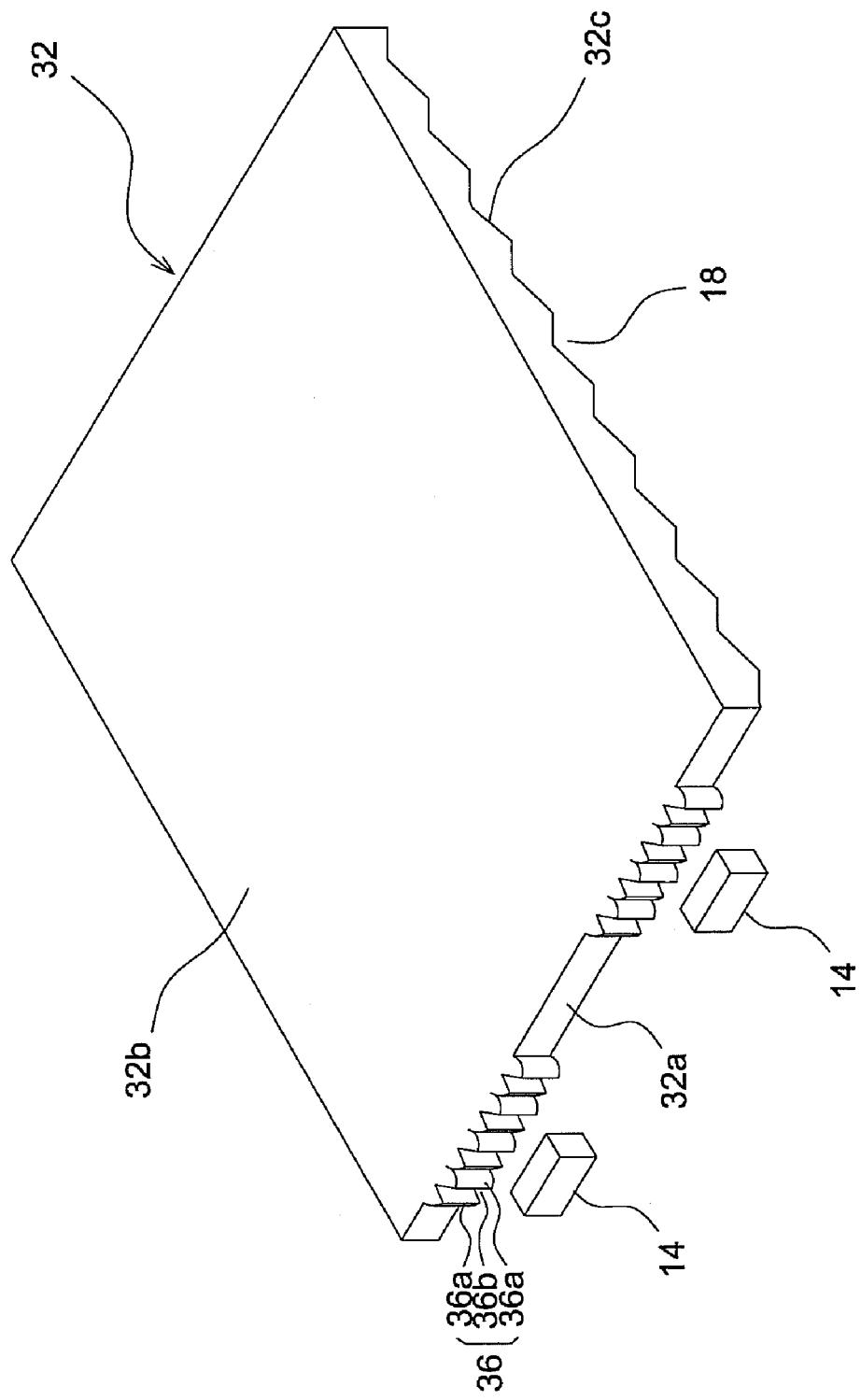
FIG. 24 shows a schematic diagram illustrating W-shaped light-diffusing structures according to another embodiment of the invention.
Figure 25A:
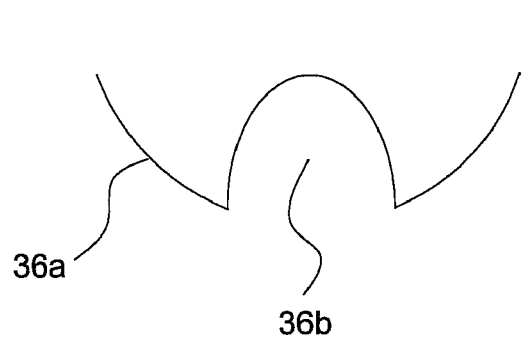
FIGS. 25A-25F show schematic diagrams illustrating different shapes of light-diffusing structures according to the invention.
Figure 25D:
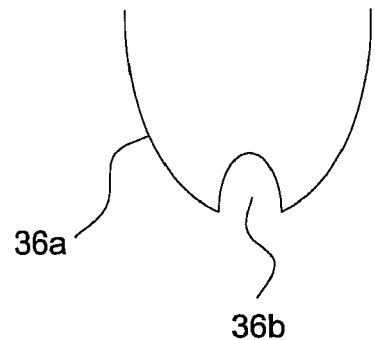
Figure 25B:
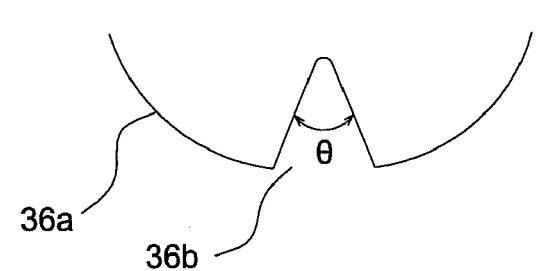
Figure 25E:
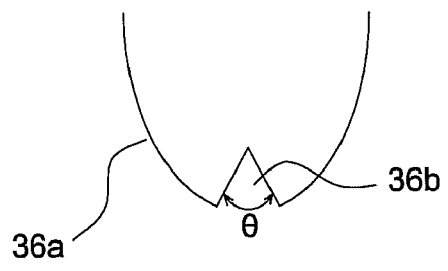
Figure 25C:
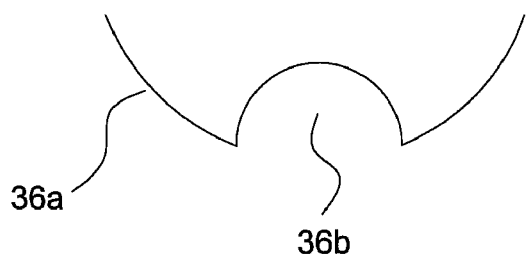
Figure 25F:
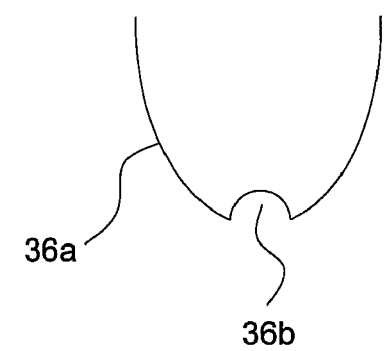

FIG. 24 shows a schematic diagram illustrating a W-shaped light-diffusing structure according to another embodiment of the invention. As shown in FIG. 24, according to this embodiment, the light-reflecting surface 32c of the light guide plate 32 is completely spread with a plurality of prismatic structures formed by V-shaped grooves 18. The light-receiving surface 32a of the light guide plate 32 is spread with a plurality of W-shaped light-diffusing structures 36, with their longitudinal directions being parallel to each other. The distributed area of the W-shaped light-diffusing structure 36 approximately overlaps the projection area on the light-receiving surface 32a where the emitting light of each LED 14 is projected. The front surface, facing the LED 14, of the W-shaped light-diffusing structure 36 is a curved side surface 36a of a pillar, and the curved surface is provided with an indentation 36b to form a W-shaped profile. The cross section of the curved side surface 36a may be in a shape of a part circle (FIG. 25A), a part ellipse (FIG. 25D), or a curved surface without a constant curvature (FIG. 25B). The cross section of the indentation 36b may be in a shape of a part ellipse (FIGS. 25A and 25D), a triangle (FIGS. 25B and 25E), or a part circle (FIGS. 25C and 25F). In this embodiment, the curvature radius for the curved side surface is preferably between 1 μm to 1000 μm. Further, in case the curved side surface 36a is an elliptic cylindrical surface, the farthest distance from the elliptic cylindrical surface to the light-receiving surface 32a is preferably larger than the intercept between two points at which the light-receiving surface 32a is intersected with the elliptic cylindrical surface. Besides, as shown in FIGS. 25B and 25E, in case the cross section of the indentation 36b is in a shape of triangle, the vertex angle θ of the triangle is preferably between 2 degrees and 150 degrees.

Figure 26:
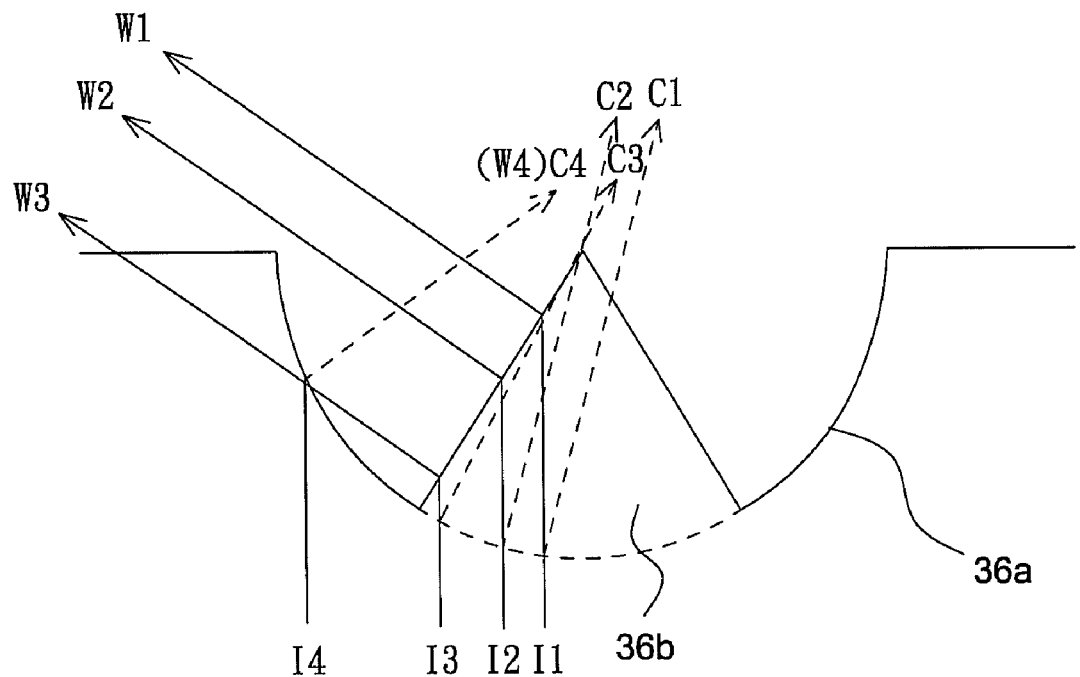
FIG. 26 shows a schematic diagram illustrating the better light-diffusing capability of the W-shaped light-diffusing structures in relation to the conventional arc-shaped structure.

FIG. 26 shows a schematic diagram illustrating the better light-diffusing capability of the W-shaped light-diffusing structure 36 in relation to the conventional arc-shaped structure. As shown in FIG. 26, since the W-shaped light-diffusing structure 36 has an indentation 36b, the incident lights 11-13 are greatly deflected when hitting the boundary of the indentation 36b; that is, a greater deflection on the propagation paths W1-W3 with indentation is achieved in relation to the propagation paths C1-C3 with no indentation. Therefore, the W-shaped light-diffusing structure 36 having the indentation 36b achieves excellent light-diffusing effect to allow for more areas of the effective section EA on the light guide plate.

Figure 27A:
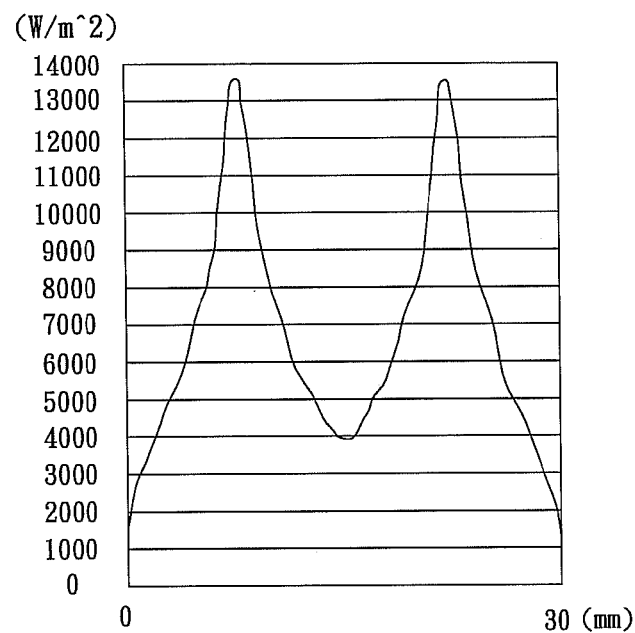
FIGS. 27A-28B show schematic diagrams illustrating the simulated light energy distributions by utilizing different light-diffusing structures.
Figure 27B:
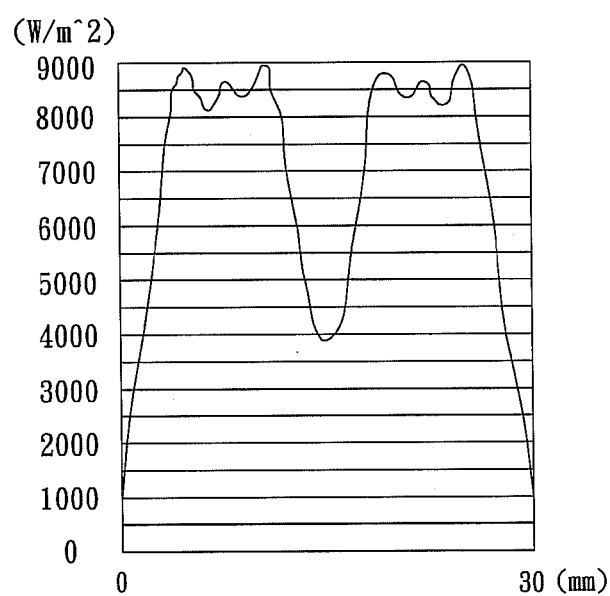
Figure 28A:
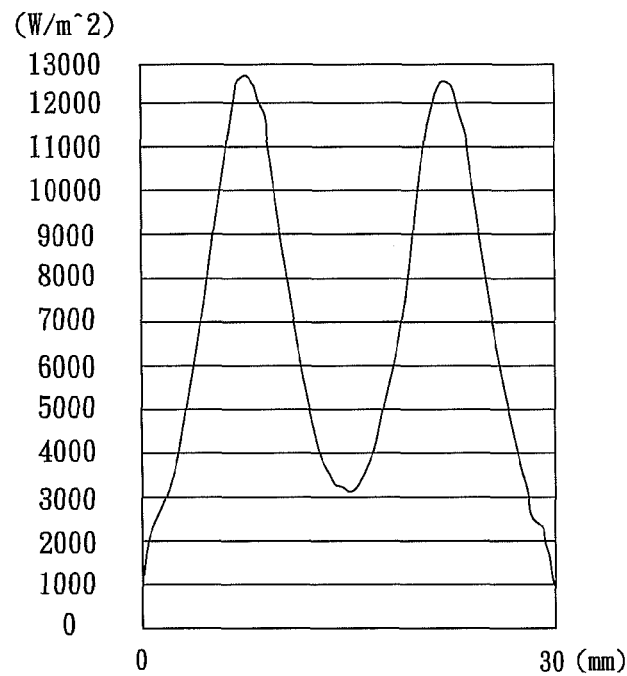
Figure 28B:
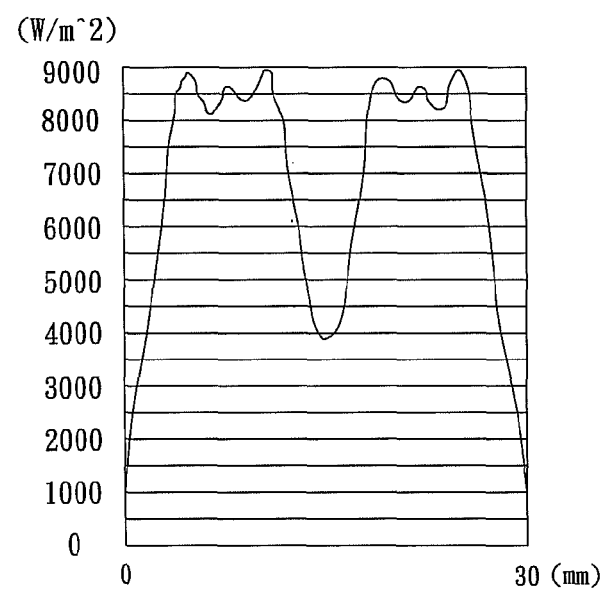

FIGS. 27A and 27B show schematic diagrams illustrating the simulated light energy distributions by utilizing different light-diffusing structures, under the condition that the distance between the point light source and the effective section is 4.65 mm. Comparing FIG. 27A with FIG. 27B, it is shown that the peak in FIG. 27B appears to be a flat trapezoid while the peak in FIG. 27A appears to be a sharp triangle. Thus, the W-shaped light-diffusing structure 36 in FIG. 27B has better light-diffusing capability than that of the conventional V-shaped structure. Similarly, comparing FIG. 28A with FIG. 28B, it is shown that the peak in FIG. 28B appears to be a flat trapezoid while the peak in FIG. 19A appears to be a sharp triangle. Thus, the light-diffusing capability of the W-shaped light-diffusing structure 36 reflected in FIG. 28B is better than that of the conventional arc-shaped structure.

FIG. 29 shows a comparison of measured values between different types of light-diffusing structures. Under the same conditions, after the lights from the point light source are diffused by elliptical light-diffusing structures 16, as the linear distance between the LED and the effective section is reduced to 2.5 mm, the brightness difference between bright bands and dark bands in the front of the light guide plate is an accepted value of 187.9 cd/m$^2$. The total luminous flux is 0.111 W and the average brightness is 74.52 cd/m$^2$. Therefore, compared to the conventional V-shaped structure, the elliptical light-diffusing structure 16 can not only reduce the linear distance between the LED and the effective section (46.24% reduction) but also increase the area of the effective section (5.57% increase). In addition, the light-receiving efficiency is greatly increased (21.62% increase) and the average brightness is also greatly increased (14.78% increase). On the other hand, after the lights from the point light source are diffused by W-shaped light-diffusing structures 36, as the linear distance between the LED and the effective section is reduced to 2.5 mm, the brightness difference between bright bands and dark bands in the front of the light guide plate is an accepted value of 189.06 cd/m$^2$. The total luminous flux is 0.113 W and the average brightness is 75.48 cd/m$^2$. Therefore, compared to the conventional V-shaped structure, the W-shaped light-diffusing structure 36 can not only reduce the linear distance between the LED and the effective section (46.24% reduction) but also increase the area of the effective section (5.57% increase). In addition, the light-receiving efficiency is greatly increased (21.62% increase) and the average brightness is also greatly increased (14.78% increase). Moreover, from the measured values, it can be seen the W-shaped light-diffusing structure 36 has better light-receiving efficiency and average brightness in relation to the elliptical light-diffusing structures 16.

FIG. 30 shows another comparison of measured values between different types of light-diffusing structures. Under the same conditions, after the lights from the point light source are diffused by the alternately arranged elliptical light-diffusing structures 16 having different dimensions (such as the embodiment shown in FIG. 15), as the linear distance between the LED and the effective section is reduced to 3.5 mm, the brightness difference of bright bands and dark bands in the front of the light guide plate is an accepted value of 185.3 cd/m$^2$. The total luminous flux is 0.103 W and the average brightness is 72.83 cd/m$^2$. Therefore, compared to the conventional arc-shaped structure having identical dimensions, the embodiment can not only reduce the linear distance between the LED and the effective section (24.73% reduction) but also increase the area of the effective section (3.15% increase). On the other hand, after the lights from the point light source are diffused by the alternately arranged elliptical light-diffusing structures 16 and V-shaped structures having different dimensions (such as the embodiment shown in FIG. 16), as the linear distance between the LED and the effective section is reduced to 3 mm, the brightness difference of bright bands and dark bands in the front of the light guide plate is an accepted value of 192.15 cd/m². The total luminous flux is 0.1 W and the average brightness is 69.05 cd/m². Therefore, compared to the conventional arc-shaped structure, the embodiment can not only reduce the linear distance between the LED and the effective section (35.48% reduction) but also increase the area of the effective section (4.52% increase).

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate used for receiving and guiding the emitting light of at least one point light source and divided into an effective section capable of providing uniform surface illumination and a transitional section between the effective section and the point light source, the light guide plate comprising:

a light-receiving surface next to the point light source for receiving the emitting light of the point light source;

a light-emitting surface making an angle with the light-receiving surface, the light that propagates in the light guide plate exiting the light guide plate through the light-emitting surface;

a light-reflecting surface positioned opposite the light-emitting surface for guiding the light that passes through the light-receiving surface to the light-emitting surface; and a plurality of light-diffusing structures spread on the transitional section, wherein each light-diffusing structure is a bump structure protruding from the light guide plate and in the shape of a part elliptic cylinder having a long axis and a short axis, and the front surface of the light-diffusing structure facing the point light source is a part elliptic cylindrical surface provided with an indentation to form a W-shaped profile.

2. The light guide plate according to claim 1, wherein the longitudinal directions of the light-diffusing structures are parallel to each other.

3. The light guide plate according to claim 1, wherein the light-reflecting surface is spread with a plurality of prismatic structures and the longitudinal directions of the prismatic structures are parallel to each other.

4. The light guide plate according to claim 1, wherein the light-diffusing structures are formed on the light-receiving surface and the distributed area of the light-diffusing structures approximately overlaps the projection area on the light-receiving surface where the emitting light of the point light source is projected.

5. The light guide plate according to claim 1, wherein the farthest distance from the part elliptic cylindrical surface to the light-receiving surface is larger than the intercept between two points at which the light-receiving surface is intersected with the part elliptic cylindrical surface.

6. The light guide plate according to claim 1, wherein at least one side surface of the light guide plate adjoins the light-receiving surface is a curved surface.

7. The light guide plate according to claim 1, wherein the cross section of the indentation cut along a direction parallel to the light-emitting surface is in the shape of a polygon, a part ellipse or a part circle.

8. The light guide plate according to claim 7, wherein the curvature radius of the part ellipse or the part circle is within a range of 1 μm to 1000 μm.

9. A light-diffusing structure formed on a transitional section of a light guide plate, the light guide plate being divided into an effective section capable of providing uniform surface illumination and the transitional section positioned between a point light source and the effective section, wherein the light-diffusing structure is a bump structure protruding from the light guide plate and in the shape of a part elliptic cylinder having a long axis and a short axis, and the front surface of the light-diffusing structure facing the point light source is a part elliptic cylindrical surface provided with an indentation to form a W-shaped profile.

* * * * *